(12) United States Patent
Brown et al.

(10) Patent No.: US 9,883,436 B2
(45) Date of Patent: Jan. 30, 2018

(54) METHOD AND APPARATUS FOR PERFORMING MOBILE HANDOVER BASED ON AN INDICATION FLAG

(71) Applicant: British Telecommunications Public Limited Company, London (GB)

(72) Inventors: Ruth Brown, London (GB); Ian Mings, London (GB); Maria Cuevas Ramirez, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/127,555

(22) PCT Filed: Mar. 4, 2015

(86) PCT No.: PCT/GB2015/050626
§ 371 (c)(1),
(2) Date: Sep. 20, 2016

(87) PCT Pub. No.: WO2015/140504
PCT Pub. Date: Sep. 24, 2015

(65) Prior Publication Data
US 2017/0142624 A1    May 18, 2017

(30) Foreign Application Priority Data

Mar. 21, 2014 (EP) ..................... 14250049

(51) Int. Cl.
*H04W 36/12* (2009.01)
*H04W 92/20* (2009.01)

(52) U.S. Cl.
CPC ............ *H04W 36/12* (2013.01); *H04W 92/20* (2013.01)

(58) Field of Classification Search
CPC . H04W 36/0055; H04W 92/02; H04W 92/20; H04W 36/00; H04W 36/0005;
(Continued)

(56) References Cited

U.S. PATENT DOCUMENTS

2007/0213060 A1    9/2007  Shaheen
2007/0254667 A1   11/2007  Jokinen
(Continued)

FOREIGN PATENT DOCUMENTS

EP    1 892 993 A2    2/2008
EP    2 645 774 A1   10/2013

OTHER PUBLICATIONS

PCT International Search Report for PCT/GB2015/050626, dated Jun. 1, 2015, 4 pages.
(Continued)

*Primary Examiner* — Daniel Lai
(74) *Attorney, Agent, or Firm* — Amy M. Salmela; Patterson Thuente Pedersen, P.A.

(57) ABSTRACT

A handover process for enabling a user terminal to transfer a connect to a network from a route by way of a source access node to a route by way of a target access node, where the nodes are controlled by different respective control systems is initiated by establishing a link between the terminal and the target node and a data forwarding tunnel between the access nodes to allow data transmitted over a link from the network to the source node to continue to be transmitted to the terminal. The backhaul connection is then re-routed by co-ordination between the access control systems. The source node transmits a flag to the target node which identifies its respective access control system. This flag is forwarded by the target node to its respective access control system to allow it to set up a data link over which relocation instructions can be coordinated to set up a data
(Continued)

link between the network and the target node, and to close the data link between the network and the source node.

4 Claims, 9 Drawing Sheets

(58) Field of Classification Search
CPC ......... H04W 36/0022; H04W 36/0072; H04W 88/12; H04W 92/045; H04W 36/0016; H04W 36/0011; H04W 28/24; H04W 36/0033; H04W 36/22; H04W 36/26; H04W 36/12
See application file for complete search history.

(56) References Cited

U.S. PATENT DOCUMENTS

| | | | |
|---|---|---|---|
| 2011/0090872 A1* | 4/2011 | Dahlen | ............. H04W 36/0022 370/332 |
| 2013/0100929 A1* | 4/2013 | Liu | ....................... H04W 36/00 370/331 |
| 2016/0345230 A1 | 11/2016 | Cuevas Ramirez et al. | |

OTHER PUBLICATIONS

PCT Written Opinion for PCT/GB2015/050626, dated Jun. 1, 2015, 11 pages.

* cited by examiner

METHOD AND APPARATUS FOR PERFORMING MOBILE HANDOVER BASED ON AN INDICATION FLAG

RELATED APPLICATIONS

The present application is a National Phase entry of PCT Application No. PCT/GB2015/050626, filed on Mar. 4, 2015, which claims priority to EP Patent Application No. 14250049.5, filed on Mar. 21, 2014, which are hereby fully incorporated herein by reference.

TECHNICAL FIELD

This disclosure relates to improvements to a mobile handover process.

BACKGROUND

A mobile handover process takes place when a mobile communications device (user terminal) is required to cease communicating with a core network through one access node (also known as a base station) and begin communication through another access node. The most common reasons for such handovers to be required are because either the user terminal or the access node detects deterioration of the signal quality on the wireless communications link between them. This can be because the mobile device is moving out of range of the access node, but other changes in the wireless environment, such as changes in congestion or interference levels, may also make a handover appropriate. Handover may also occur when a user "roaming" on a network other than his "home network" (the one to which he subscribes) moves into range of an access node of his home network: in such a case a handover to the home network is desirable as soon as signal quality between the user terminal and the home network meets a predetermined threshold, regardless of the signal quality on the other network, because this will allow the user to use any facilities specific to his "home" network, and avoid paying the higher charges usually required for connection through a network other than the user's home network.

Unless the context requires otherwise, the term "access node" should be interpreted in this specification to mean any device or apparatus with which a terminal may communicate wirelessly in order to allow the terminal to communicate with a backhaul connection to a core communications network. It includes, for example, access points (wireless routers) for "WiFi" (IEEE 802.11 standard) access networks, as well as the base stations used in cellular telephony.

The decision to initiate a handover, and the selection of a new link to which to hand over, is typically based on signal strength and a connection is established with the access node generating the strongest signal (subject to the access node's capacity and authority to accept a connection with the mobile unit).

For present purposes the access node to which the user terminal is initially connected will be referred to as the "source" node, and the node to which handover is to be made will be referred to as the "target" node. There is in general no significant difference in practice between the nodes—in any particular session an individual node may be the target node in a first handover and the source node in a subsequent handover, either back to the original source node (now acting as a target node) or to a third node.

Embodiments will be described herein using the terminology of the 4G or Long Term Evolution (LTE) standard, but the underlying principles are applicable to other mobile communications systems and the use of this terminology should not be taken as limiting.

In most network architectures the connections between individual access nodes (also known as base stations or, in the LTE standard, as eNodeB's or eNBs) and the rest of the network are controlled by access control systems, also known as in the LTE standard as MMEs (mobile management entities), Typically, several access nodes may be controlled by the same access control system, and when a handover is arranged between two of those nodes the whole process can be managed by the access controller. In a cellular system with access nodes in permanent locations, it is conventional to maintain a "neighbor list" for each access node which can be used to inform the mobile unit of the base stations to which handover is most likely to be possible. However, when both source and target access nodes are associated with the same access control system, and a suitable interface exists between the nodes, a so-called X2-based handover can be affected. This enables faster handover for latency-critical applications such as voice services and gaming as well as less load on the core network components.

However, in the general case, if the source and target nodes are associated with different access control systems (MMEs) there is normally no direct signaling interface between the source and target access nodes and all handover messages are conventionally passed via the access control systems (MMEs) associated with the respective access nodes (herein referred to respectively as the source access control system or source MME and the target access control system or target MME), and the data path is also tunneled by way of the respective source and target Service Gateways (SGWs) through which the respective access nodes are connected to the rest of the network. This implies longer latency for data traffic during handover as well as longer handover times and additional load on the core network. As national roaming agreements are becoming more common (that is, handing off between different operators in the same region) handovers between different access control systems (MMEs) are becoming more common. For example when a user leaves a home environment where he has a private hotspot connection from his service provider into a public wide-area macrocell operated by a cellular partner, the signal strength drops very rapidly so fast handover is needed to maintain the session.

If the MMEs are both controlled by the same user plane entity, as is described for example in United States Patent App. Pub. No. US2007/254667 (Jokinen), the handover can be mediated by that user plane, which can determine whether both the target and source MMEs support the "X2"-based handover. However, in general the MMEs will be associated with different control planes and will therefore not have visibility of each other's capabilities. In the absence of such information, the MMEs default to the less efficient "S1" handover process in which data is redirected by way of a tunnel from one MME to the other by way of the gateways.

SUMMARY

According to the disclosure, there is provided a handover process for causing a communications access connection between a user terminal and a core network to be diverted from a first routing by way of a source access node controlled by a first handover control system to a second routing by way of a target access node controlled by a second handover control system, in which the source access node transmits a path switch request to the target access node, wherein at least one of the source access node and the target access node is capable of generating and detecting flags indicative of the identity of the first control system from which the source access node is controlled, and wherein the source access node initiates forwarding of data received from the network and destined for the user terminal, such that data is routed from the source access node to the target access node for onward transmission to the user terminal, wherein if flag data is generated by the source access node and detected by the target access node it the data is forwarded to the second access control system to initiate a co-operative process between the source access control system and the target access control system to establish the second routing between the user terminal and the network, and if the target access node does not detect a flag in the handover request, the path switch request is rejected and a path switch request is transmitted from the source node to its respective access control system to initiate a path switch process mediated through the core network In one embodiment, if the target access node is enabled to initiate a path switch request, it responds to detection of the flag in a path switch request by retransmitting the said flag to the source access node, and on detection of the retransmitted flag the source access node initiates the establishment of the second routing, and if the source node does not detect a retransmitted flag it initiates a path switch process mediated through the core network. This allows each of the access nodes to determine, by the successful exchange of flag signals, that the other access node is enabled to initiate a direct path switch. If either access node fails to receive a flag signal from the other, either in a path switch request or in an acknowledgement of such a request, it recognizes that the other access node does not have the necessary capability to initiate a direct transfer of data, so instead initiates a path switch process mediated through the core network In another aspect, the disclosure provides a mobile communications access node for providing a communications connection between a user terminal and a network, the access node having a handover processor for processing handover requests, wherein the handover processor is configured to detect a signal, received from another access node associated with a first handover control system, to hand over a connection with a user terminal, and to forward the request to a second handover control system associated with the mobile communications access node, a monitor to identify the presence of a flag in the request, the flag identifying the access node transmitting the request and a first handover control system with that access node, and indicative that the first handover control system is capable of co-operation with handover control systems of a class to which the second handover system belongs to effect a handover, the handover processor being responsive to handover requests in which the flag is not present to cause data destined for the user terminal to be redirected to a gateway for forwarding to a redirection address subsequent to completion of a handover, the handover processor being responsive to a request in which the flag is present to forward data to the access node identified by the flag; a data receiver to receive data destined for the user terminal from the other access node; a data transmitter to transmit data, received from the other access node, to the user terminal; and wherein the handover processor is configured to generate a path switch request flagged to indicate to a further handover control system that the handover processor is capable of co-operation with another access point to effect a handover.

Such an access node is thus capable of operation as a target node in the process defined above.

In one embodiment the mobile communications access node also comprises a handover processor for generating a handover request for transmission to another access node in order to transfer a connection between a user terminal and a network currently routed by way of the access node such that it is routed by way of the other access node, having a flag generator to generate a flag in the request, the flag identifying a first handover control system associated with the access node transmitting the request, and indicative that the first handover control system is capable of co-operation with another handover control system to effect a handover.

Such an access node is therefore also capable of operating as a source node, in co-operation with another acting as the target node, in the process defined above.

BRIEF DESCRIPTION OF THE DRAWINGS

An embodiment of the invention will now be described by way of example with reference to the drawings, in which.

DETAILED DESCRIPTION

Figure 1:
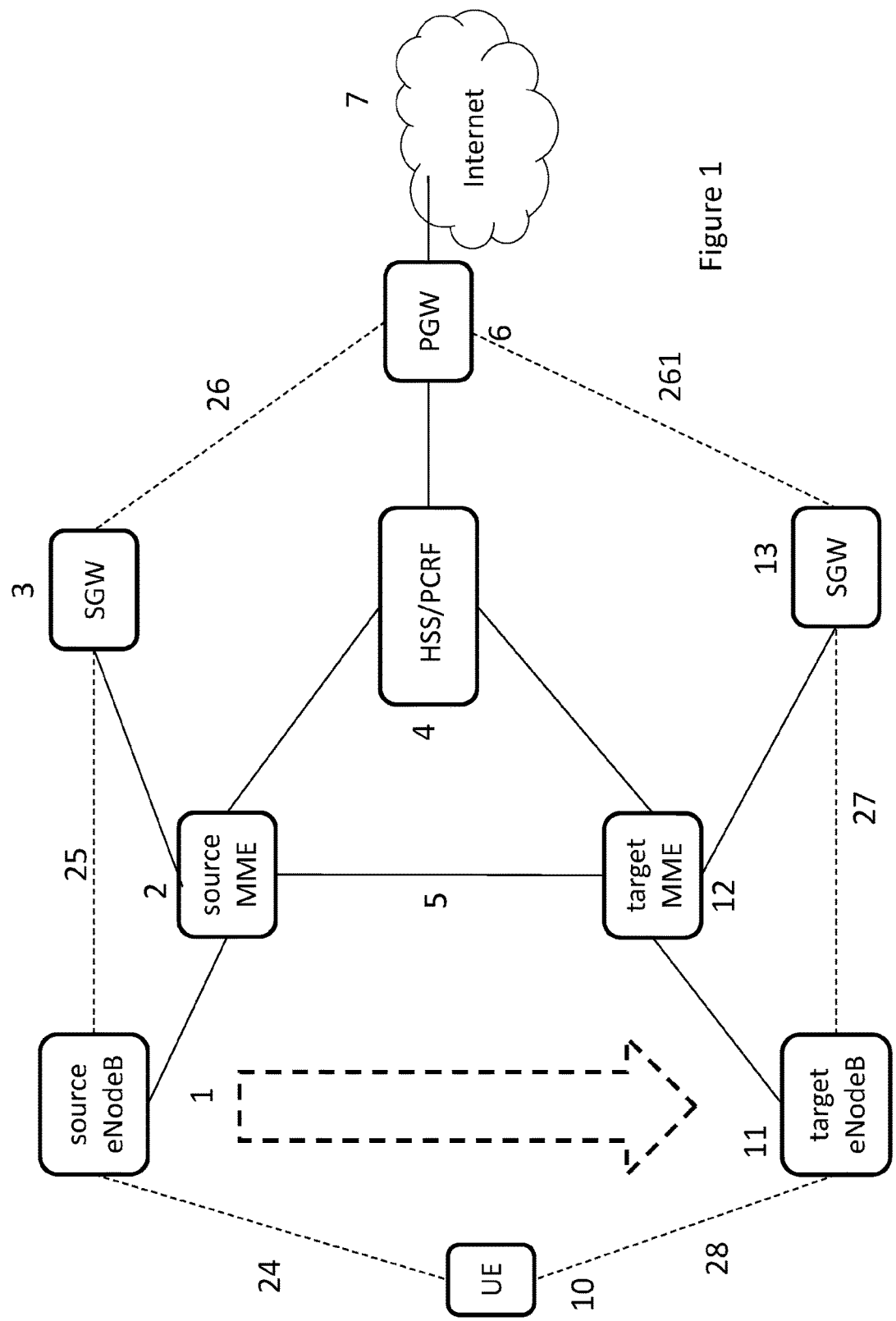
FIG. 1 is a schematic depiction of the elements which co-operate to perform an embodiment of the disclosure.

FIG. 1 depicts a user equipment (UE) 10 in the process of handing over between two base stations (eNodeB) 1, 11. The base stations are connected to through respective mobile management entities (2, 12) to respective serving gateways 3, 13. The mobile management entities 2, 12 are also in communication with a HSS (Home Subscriber Server) and policy and charging rule function (PCRF) 4 which handles permanent user data, charging policies, limitations on access to the system etc. The serving gateways 3, 13 and HSS/PCRF 4 are also in communication with a public data network gateway (PGW) 6 which gives access to a public data network (PDN) such as the Internet 7.

In existing signaling interface 5 known as S10 interfaces are present between the MMEs 2, 12, used for example when a user moves between areas served by different MMEs.

Figure 2:
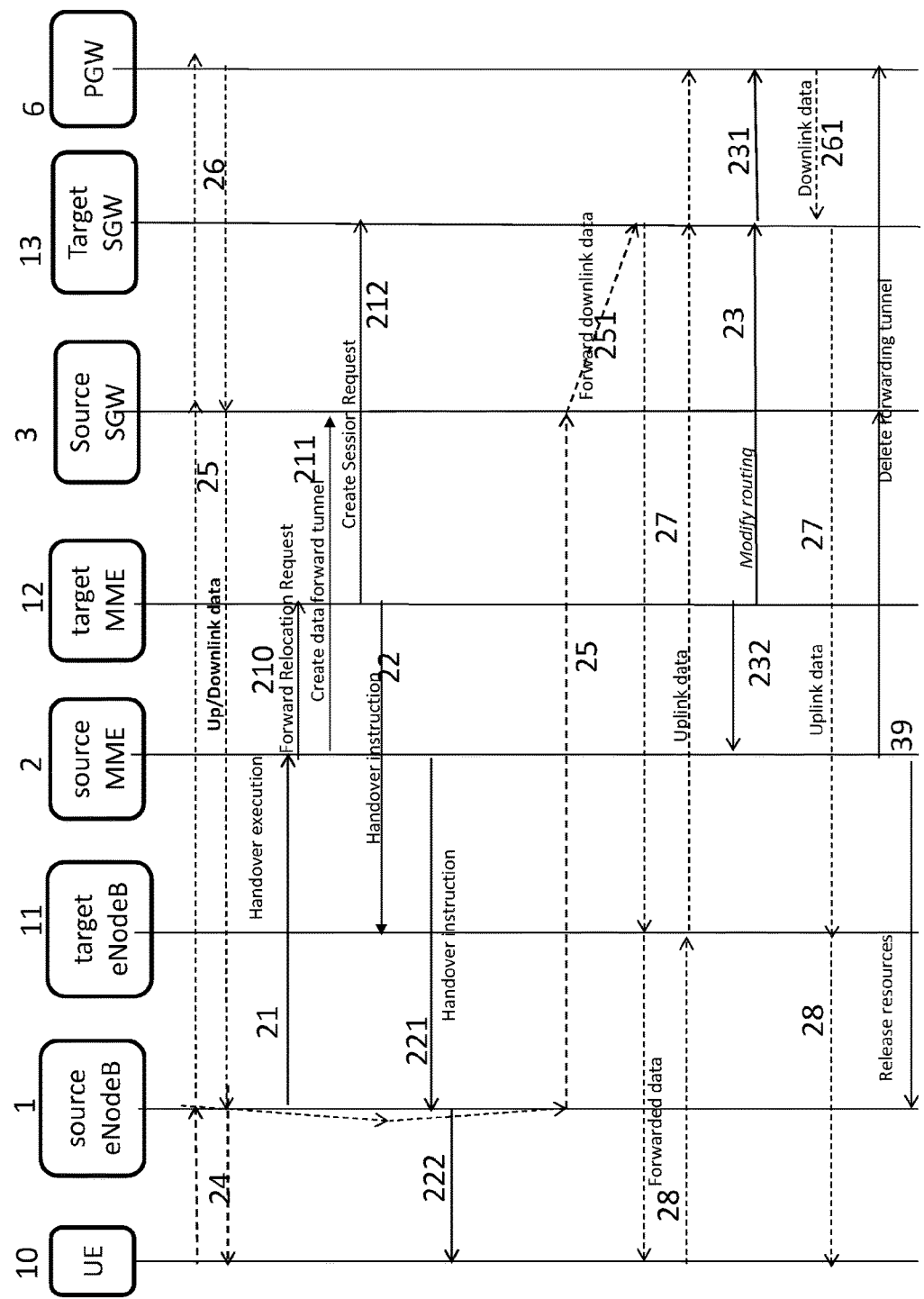
FIG. 2 is a sequence diagram for the conventional "S1" handover process between nodes both managed by a single mobile management entity.
Figure 4:
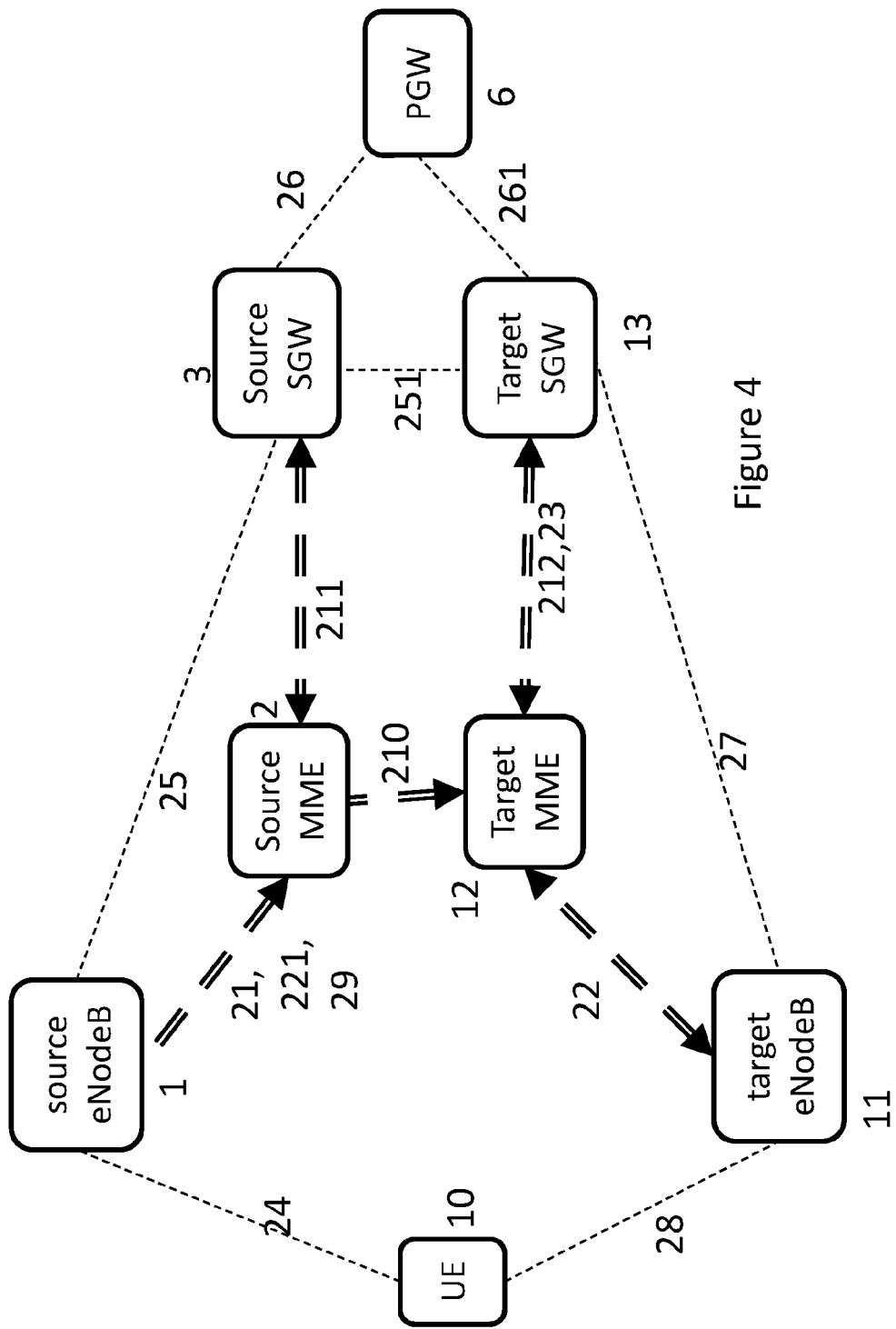
FIG. 4 is a schematic depiction of the principal elements of the S1 process of FIG. 2.
Figure 7:
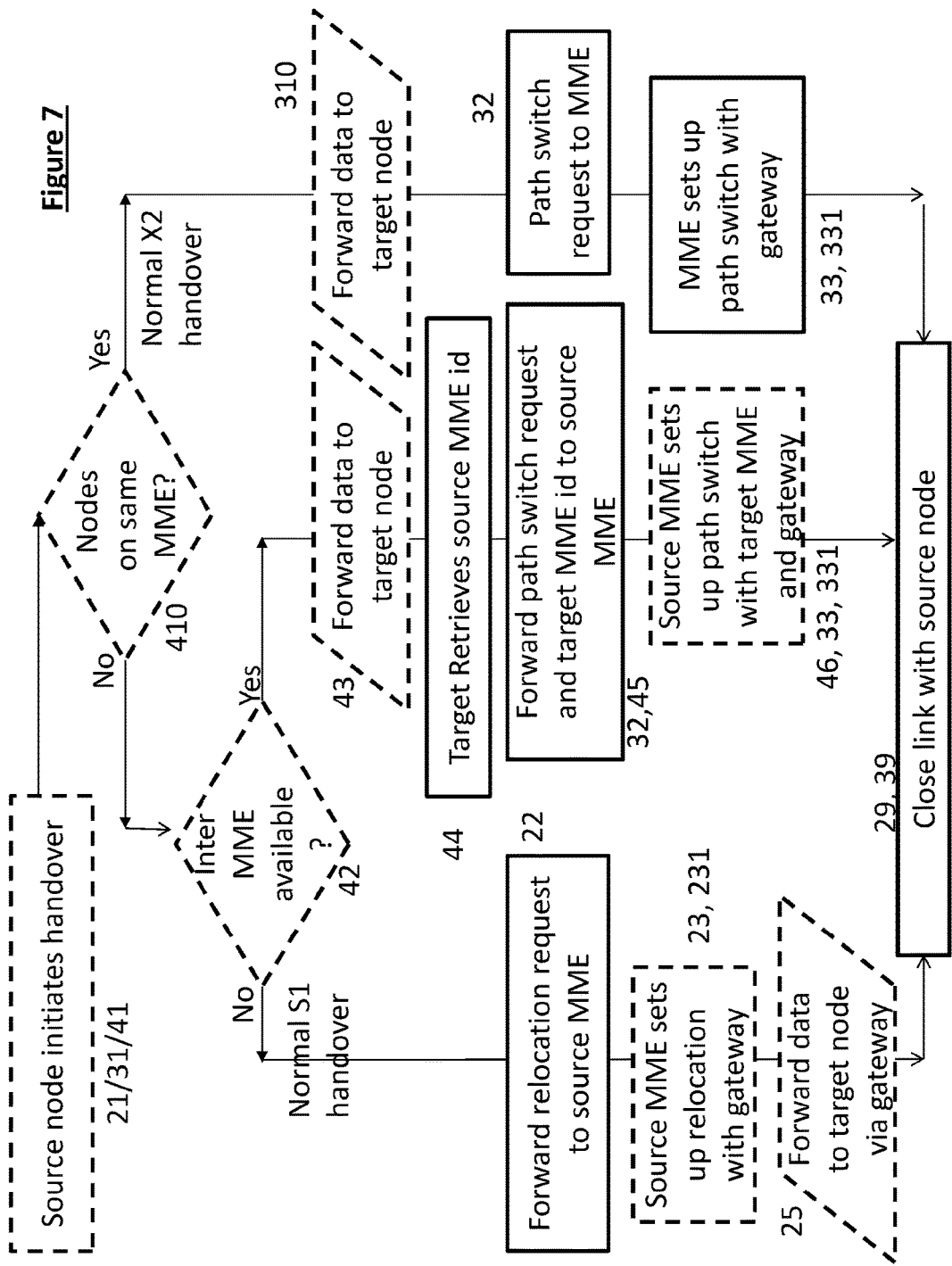
FIG. 7 is a flow diagram illustrating the operation of the nodes (access points) capable of interacting according to an embodiment of the disclosure.

FIG. 2, FIG. 4 and the left hand side of FIG. 7 illustrate the conventional S1 handover process. The solid lines in FIG. 2 and the heavy arrows in FIG. 4 indicate control signaling managed by the MME, and the dashed lines indicate the data connections.

The process is described in detail in 3GPP TS 23.401 and activities not relevant to the present disclosure are not labeled or described in detail here.

This process allows co-operation between MMEs in the general case where the two nodes 1, 11 are not managed by the same MME 2. As will be seen, the original data connection between the mobile unit 10 and the PDN gateway 6 is made by a connection 24 to the source node 1, and a GTP (GPRS tunneling protocol) connection 25, 26 from the base station 1 to the PDN gateway 6 by way of the serving gateway 3. When a handover is to be arranged, the initial activity 21 is an interaction between the source node 1 and the source MME 2. This handover request is forwarded to the target MME 12 (at 210). The target MME 12 operates a resource allocation interaction 22 with the target base station 11 and an interaction with the target gateway 13 to modify the bearer links 25, 24 such that a new GTP link 261, 27, 28 is connected between the PDN gateway 6 and the user terminal 10 by way of the target gateway 13, target MME 12 and target node 11.

The source MME 2 passes the handover instruction to the user terminal 10 (at 221, 222) after which data can be transmitted over the new connection 27, 28 to and from the user terminal 10.

Downlink data already received by the source node 1 over the old data link 25 from the source gateway 3 has to be forwarded to the target node 11 for onward transmission over the new link 28. This is generally achieved by creating a "tunnel" between the source eNodeB 1 and the target eNodeB 11. The tunnel is set up by a control message 211, 212 from the MMEs 2, 12 to their associated gateways 3,13 allowing data received by the source node 1 to be returned to the source gateway 3, and transmitted over a link 251 to the target gateway 13 from where it can be forwarded over the new links 27, 28 This may be either directly between the nodes 1, 11 or, as shown, by way of the gateway 3 (or gateways 3, 13) and the links 25, 27 between the gateway and the respective nodes 1, 11.

The target MME 12 transmits signals 232, 23 to the source MME 2, and target gateway 13 indicating that the routing is to be modified. The target gateway 13 forwards this routing change signal 231 to the PDN gateway 6 to cause incoming data destined for the terminal 10 to be routed to the target gateway 13 (link 261) instead of the source gateway (link 26). The source MME 2 signals to the source node 1, source gateway 3 and PDN gateway that the links can be released and the forwarding tunnel shut down (at 39).

It will be noted that the new link 28 cannot be established in this process until the handover instructions 21, 210, 22 have been passed by way of the MMEs 2, 12. If signal strength over the initial link 24 is being lost rapidly this can result in a loss of signal, resulting in an interruption or increased latency to the session.

Figure 3:
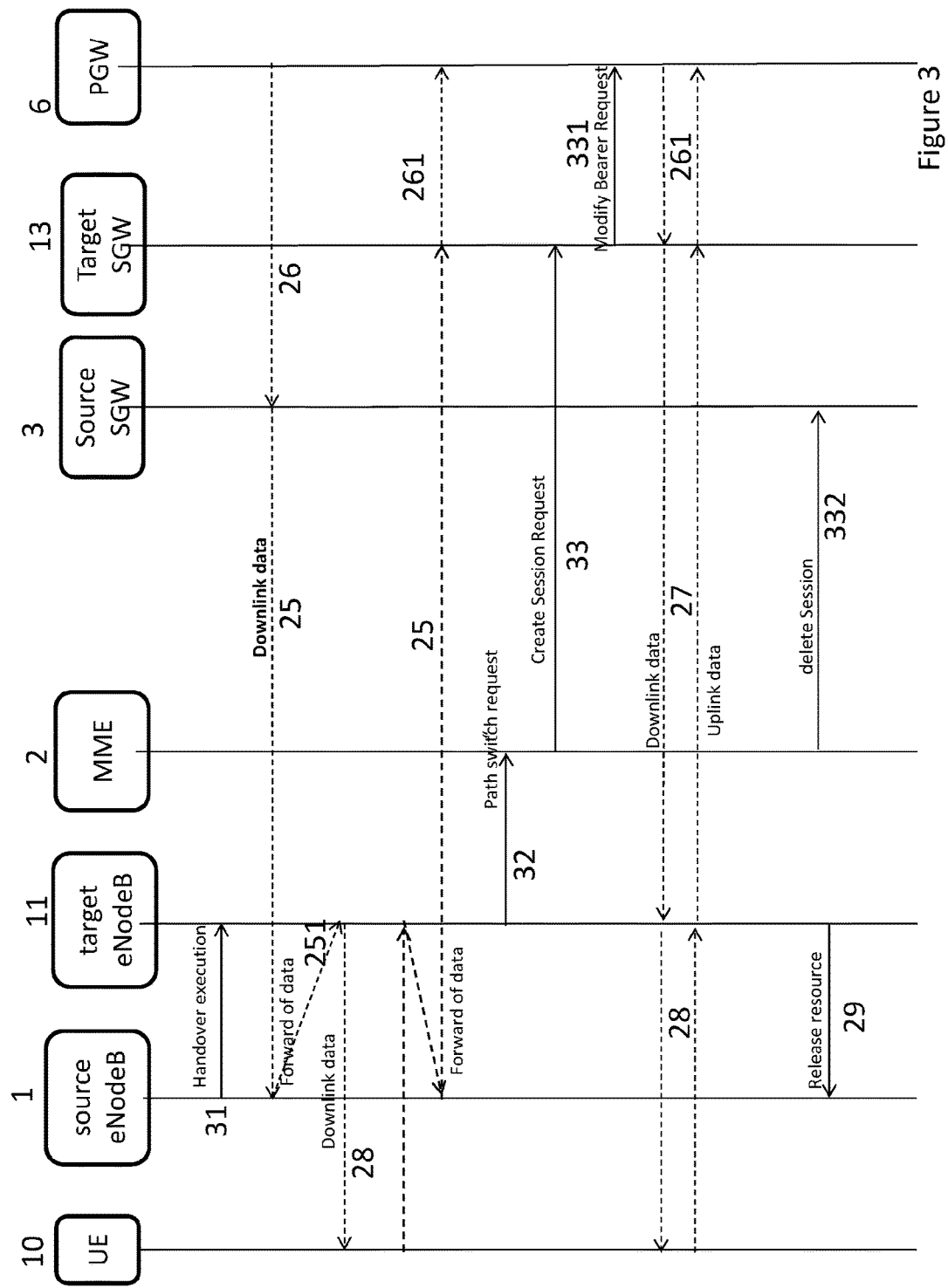
FIG. 3 is a sequence diagram for the conventional "X2" handover process between nodes both managed by a single mobile management entity.
Figure 5:
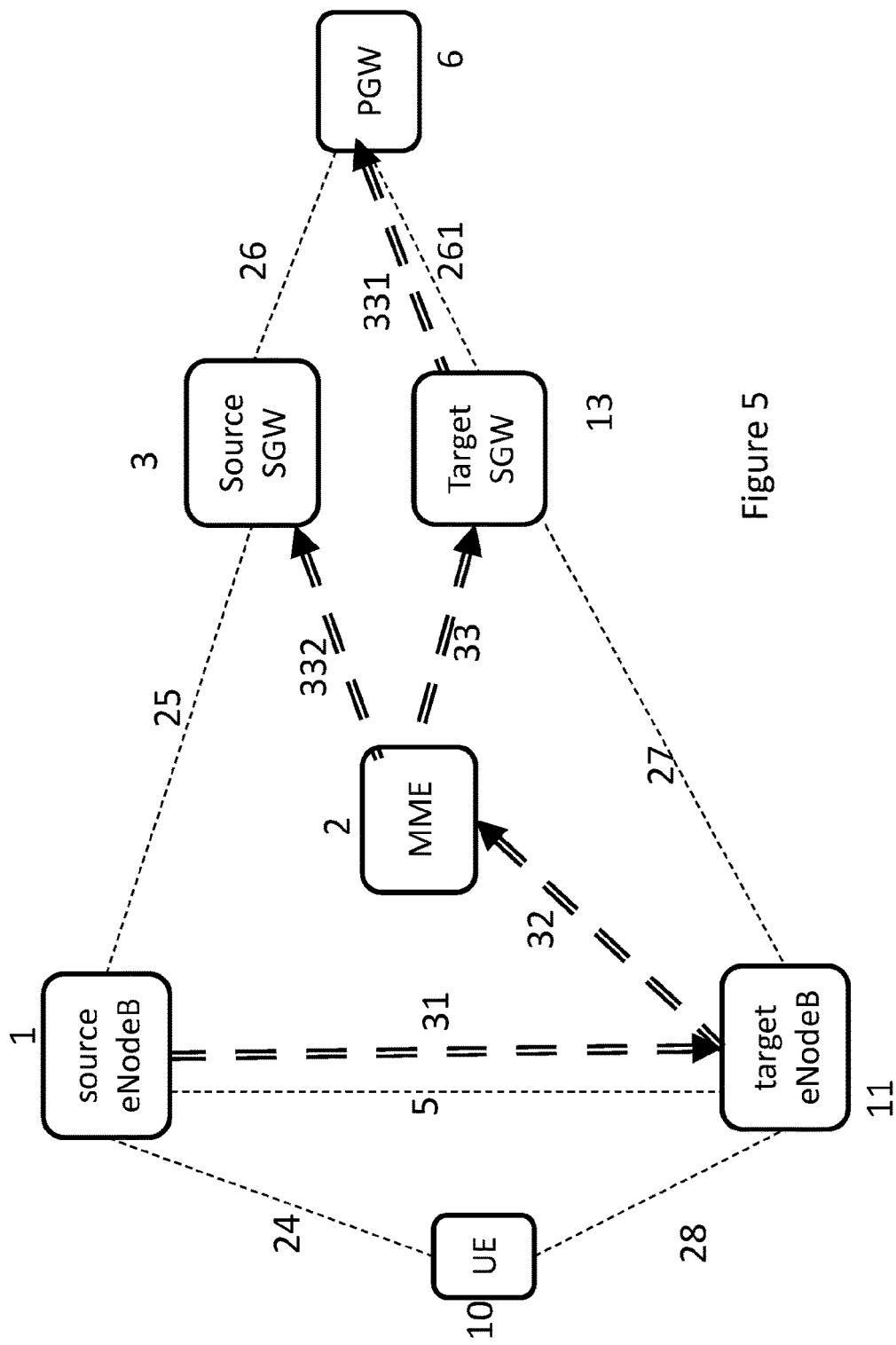
FIG. 5 is a schematic depiction of the principal elements of the X2 process of FIG. 3.

FIG. 3, FIG. 5 and the right hand side of FIG. 7 illustrate the prior art X2 handover process. The solid lines in FIG. 3 and the heavy arrows in FIG. 5 indicate control signaling managed by the MME, and the dashed lines indicate data links.

The process is described in detail in 3GPP TS 23.401 section 5.5.1.1. Activities not relevant to the present invention are not labeled or described in detail here.

This process provides a simpler handover procedure than the S1 process described above when the two nodes 1, 11 are managed by the same MME 2. Therefore if the target node 11 is identified as working to the same MME 2 as the source node 1 (at 410), the X2 handover process can be mediated directly between the nodes (eNode B) 1, 11 involved in the handover. In this process the initial handover at 31 is an interaction between the nodes 1, 11. Downlink data received by the source node 1 over the initial downlink 25 can be forwarded 310 to the target node 11 for downlink 28 to the terminal before the change is reported to the MME 2 (at 32).

In this system the handover is arranged between the access nodes 1, 11, and downlink data can be forwarded from the source node 1 to the target node 11 before a message is sent to the source MME 2 to establish new backhaul connections 261, 27 and close the original connections 25, 26. Therefore, unlike in the S1 situation, the MME 2 only gets involved after the new wireless connection 28 has been established. This allows much faster handover.

Once the source MME 2 is informed of the handover (at 32) the source MME 2 transmits a session request 33 to the target gateway 13 to set up a new direct link 27 to the target node 11, and will in turn send a message 331 to the PDN gateway 6 to divert traffic for the user terminal 1 to be routed via the target gateway 13. Once this link 27 is established a further signal 332 is sent to the source gateway to close the bearer link 25 to the source node 1. (This is the general case—as the nodes 1, 11 are both served by the same MME 2, in many circumstances the source and target gateways 3, 13 will be one and the same, so the MME 2 will send both the create and delete session requests 33, 332 to the same gateway and the PDN gateway 6 makes no change.)

This sequence provides for better continuity of service as the link 28 between the terminal 10 and the target node 11 is established earlier in the procedure, reducing the risk of the session dropping out if the link 24 is lost.

The X2 mode is quicker than S1, but current standards do not allow for X2-based handover unless both eNBs 1, 11 are connected to the same MME (2). The present disclosure provides for handovers between nodes 1, 11 working to different MMEs 2, 12.

Figure 6:
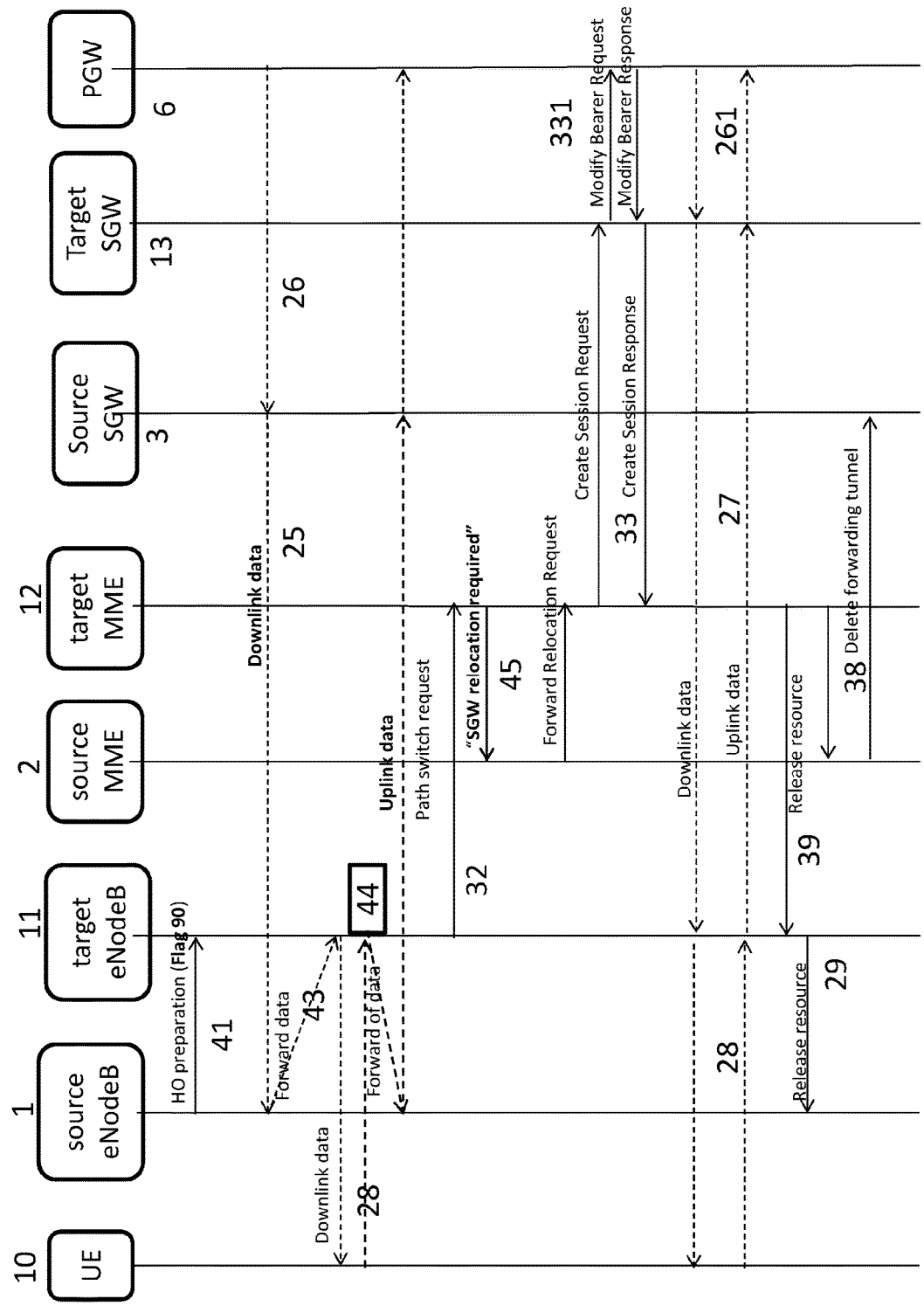
FIG. 6 is a sequence diagram depicting the operation of this embodiment of the invention, which is a modification of the conventional X2 process of FIG. 5.

Referring now to FIG. 6 and FIG. 7, the process operates as a modification of the X2 process depicted in FIG. 3 and FIG. 5. However, two MMEs 2, 12 are involved in this process, and this requires extra signaling. According to embodiments, when a node 1 (hereinafter referred to as the source node, and indicated by dashed lines in FIG. 7) initiates a handover (at 41) it transmits a flag 90 to the target node 11 indicating that it is capable of supporting an inter-MME handover process, and identifying the address of its associated MME 2. In one embodiment the source node 1 will be aware, from an internal database 841 of neighboring nodes, whether the target node is also capable of supporting the inter-MME process, and will only initiate the process if that is the case: otherwise initiating an S1 Type handover as illustrated in FIGS. 2 and 3 (at 22 onwards). Alternatively, if a target node 11 not capable of supporting the inter-MME handover process receives a message with the flag 90 the target node 11 will detect the flag as an error and reject the handover, after which the source node will attempt an S1 type handover. The former process is preferred as it reduces the delay caused by the rejection and re-attempt.

When a target node 11 (indicated by solid lines in FIG. 7) capable of supporting the inter-MME handover process receives a handover request 21/31/41 it first determines whether the source node 1 works to the same MME 2, as the target node 12 does (at 410, and see FIG. 3), and if this is the case it initiates a normal X2 handover process 31, 32, 33. Otherwise, if the source node 1 does not support the process at 42 the source node 1 initiates the S1-type process described with respect to FIGS. 2 and 3 (at 22, 23, 25). Consequently, if either of the nodes is not capable of supporting the inter-MME handover process of the disclosure, the flag is either not sent, or is rejected, and the source node then either initiates a normal S1 handover, or an X2 handover if both nodes work to the same MME.

However, when both the source node 1 and target node 11 are capable of operating the process of the disclosure, the flag 90 is both generated by the source node 1 and detected by the target node 11, and a data link 43 is established over which data may be forwarded to the target node.

The target node, on detecting the flag indicating an inter-MME handover (at 44) establishes a new downlink 28 with the terminal over which data received over a link 43 from the source node 1 may be forwarded. It should be noted that at this stage the actual handover of the wireless connection of the terminal 10 from source node 1 target node 11 has already taken place. The remaining process is required to transfer the backhaul connections 25, 26, between the nodes and the PDN gateway 6 to operate by the new route 27, 261. In order to do this, the target node 11 transmits a change path request 32 to its respective MME 12, together with the information 44 carried by the flag 90 relating to the source MME 2.

On receiving a change path request 32 with the flag 90, the target MME 12 extracts the address data of the source MME 2 (at 44) and sets up an interface with the source MME 2 to allow the relocation (path change) to be coordinated (at 43). The target MME 12 can process the session request with its associated serving gateway 13 (at 33), allowing the PDN gateway 6 to modify the bearer data (at 331).

The remainder of the handover is managed by the target MME 12, with the additional task of transmitting a notification 45 to the source MME 2 to indicate that the session has been transferred to the target MME 12, allowing the source MME to close down the original session with its serving gateway 3 (at 46). It also informs the source MME 2 of the identity of the gateway 13 associated with the target MME 12 so that, if it is different, the source MME 2 can instruct its own associated gateway 3 to drop the session (at 38).

Once the new path is established the target MME 12 can forward an acknowledgement to the target node 11 (at 29) which can then instruct the source node to release its resources (at 39)

Figure 8:
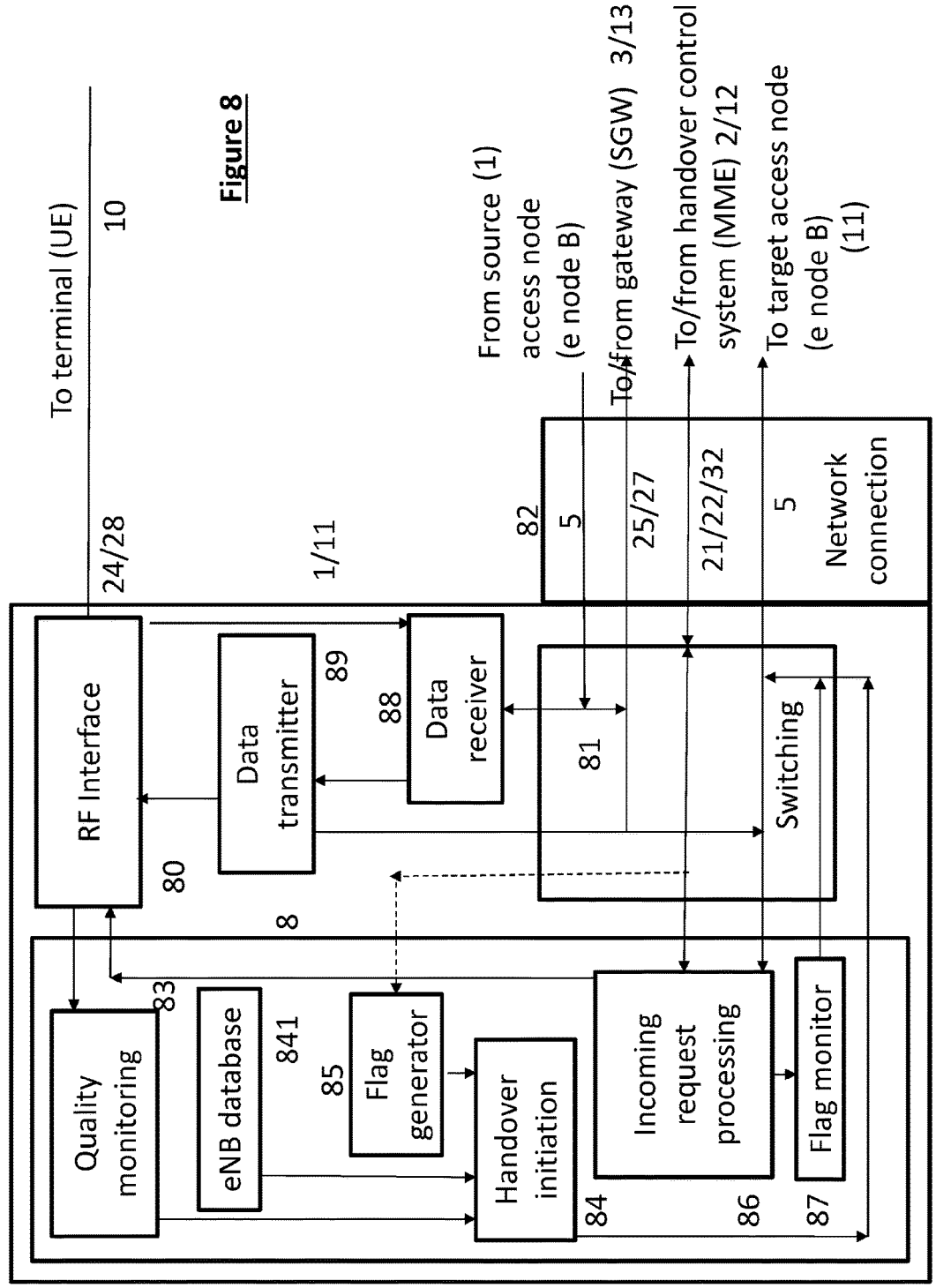
FIG. 8 is a diagram illustrating schematically he functional elements of an access node according to an embodiment of the disclosure.
Figure 9:
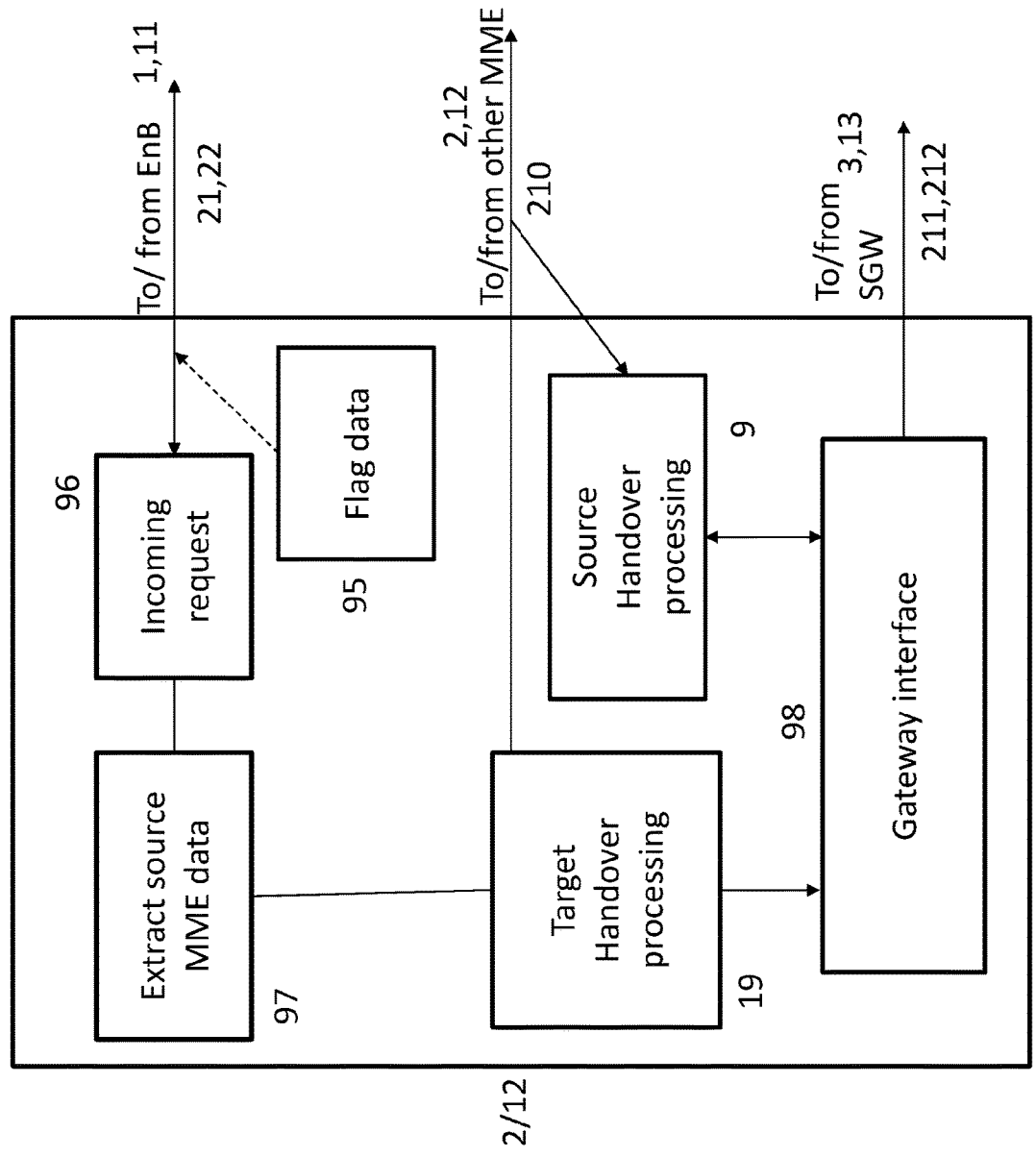
FIG. 9 is a diagram illustrating schematically the functional elements of an access control system according to an embodiment of the disclosure.

FIG. 8 is a diagram illustrating schematically the functional elements of an access node capable of operation according to an embodiment. FIG. 9 is a diagram illustrating schematically the functional elements of an access control system according to an embodiment n. It will be appreciated that these elements may be implemented by software. The handover process involves co-operation between two access nodes of the general type depicted in FIG. 8, operating through two access control systems of the general type depicted in FIG. 9, although in both cases the nodes and access control systems may differ in detail.

The access node in FIG. 8 can operate the process described above acting as either a source node 1 or a target node 11. It comprises a wireless interface 80 for communicating with one or more co-operating user terminals 10, and a network connection 82 through which the access node may be connected to other access nodes 1, 11, a network gateway (SGW) 3, 13, and a handover control system (MME) 2, 12. A switching system 81 controls the routing of data from the various inputs and addressing for onward transmission. A data receiving function 88 and data transmission function 89 process data being passed through the access point, providing functions such as buffering or reformatting.

A handover processing unit 8 comprises a quality monitoring function 83 for measuring the quality of the wireless link 24, 28 between the interface 80 and any user terminal 10 currently connected to the access node, providing an input to a handover initiation processor 84. The handover initiation processor transmits a handover initiation signal over the network connection 82, and virtual link 5 to a target access node 11. This signal includes a flag generated by a flag generation unit 85 indicating that the access point is associated with a handover control system 2 capable of supporting a handover, and identifying that handover control system. This identity will have been provided to the flag generator 85 by the handover control system (MME) 2 by way of the link 32 and the network connection 82, as will be described with reference to FIG. 9.

The handover processor 8 also has an incoming handover processor 86 for processing handover requests generated by other access points 1, and received over the virtual connection 5 through the network connection 82, allowing the access point to operate as a target node 11. Associated with this processor 86 is a flag monitor 87. If the flag monitor detects a flag in an incoming request, it forwards the data in the flag, which includes the identity of the source handover control unit 3, to its associated access control system (MME) 12.

FIG. 9 depicts an access control system capable of operation as either a source MME 2 or a target MME 12 according to an embodiment. It has signaling connections 21, 22 to the access nodes 1, 11 under its control, a further connection 211, 212 to one or more service gateways 3, 13 and a further connection 210 to other access control systems 2, 12. It has a handover processing function 9, 19 which generates instructions to the access nodes 1, 11, gateways 3, 13 and other access control systems 2 in order to establish and release communications links between them as part of the handover process, in response to handover requests transmitted from another access control system 1 either directly, or by way of a gateway 13 or another handover control system 12. Separate functions 9, 19 are depicted, respectively for operation of the system as a source or a target. When operating as a target MME 12, instructions received from a target access node 1 are processed by a path switch request-receiving function 96 which has an associated monitoring function 97 to identify whether a source MME 2 is identified in a flag carried by the path switch data. If such data are present, the handover processor 19 mediates the handover process with that other access control system (MME) 2. If no such flag data is present, the request is forwarded by way of a gateway interface 98 to the associated gateway 3.

When operating as a source handover control unit 2 the handover processing unit 9 may receive requests for handover either from the associated gateway 3 or from another access control system 12, depending on whether the target system 12 is also enabled to operate the inter MME handover process of the invention. The access control system also has a flag generation unit 95 for generating data identifying the unit as having the capability to co-operate directly with similar units and transmitting that data to access nodes 1, 11 to which it is connected in order to program their flag generators 8 (FIG. 8).

The invention claimed is:

1. A mobile communications access node for providing a communications connection between a user terminal and a network, the access node comprising:

a handover processor for processing handover requests, wherein the handover processor is configured to detect a signal, received from another access node associated with a first handover control system, to hand over a connection with a user terminal, and to forward the request to a second handover control system associated with the mobile communications access node;

a monitor to identify a presence of a flag in the request, the flag identifying the access node transmitting the request and a first handover control system with that access node, and indicative that the first handover control system is capable of co-operation with handover control systems of a class to which the second handover system belongs to effect a handover, wherein the handover processor is responsive to handover requests in which the flag is not present to cause data destined for the user terminal to be redirected to a gateway for forwarding to a redirection address subsequent to completion of a handover, wherein the handover processor is responsive to a request in which the flag is present to forward data to the access node identified by the flag;

a data receiver to receive data destined for the user terminal from the other access node;

a data transmitter to transmit data, received from the other access node, to the user terminal;

and wherein the handover processor is configured to generate a path switch request flagged to indicate to a further handover control system that the handover processor is capable of co-operation with another access point to effect a handover.

2. A mobile communications access node according to claim 1 comprising:

a handover processor for generating a handover request for transmission to another access node in order to transfer a connection between a user terminal and a network currently routed by way of the access node such that the connection is routed by way of the other access node, having a flag generator to generate a flag in the request, the flag identifying a handover control system associated with the access node transmitting the request, and indicative that the handover control system is capable of co-operation with another handover control system to effect a handover.

3. A handover method for causing a communications access connection between a user terminal and a core network to be diverted from a first routing by way of a source access node controlled by a first handover control system to a second routing by way of a target access node controlled by a second handover control system, the method comprising:

transmitting, by the source access node, a first path switch request to the target access node, wherein at least one of the source access node and the target access node is capable of generating and detecting flags indicative of the identity of the first control system from which the source access node is controlled;

initiating, by the source access node, forwarding of data addressed to the user terminal to the target access node for onward transmission to the user terminal;

forwarding the data to the second access control system to initiate a co-operative process between the source access control system and the target access control system to establish the second routing between the user terminal and the network upon the flag data being generated by the source node and detected by the target access node; and rejecting the first path switch request and transmitting a second path switch request from the source node to an access control system of the source node to initiate a path switch process mediated through the core network upon the target access node not detecting a flag in the handover request.

4. A handover method according to claim 3 wherein:

the target access node responds to detection of the flag in the first path switch request by retransmitting the flag to the source access node, and on detection of the retransmitted flag the source access node initiates the establishment of the second routing, upon the target access node being enabled to initiate the first path switch request, and the source node initiates a path switch process mediated through the core network upon the source node not detecting a retransmitted flag.

* * * * *